United States Patent
Nguyen-Schaefer et al.

(10) Patent No.: US 8,894,285 B2
(45) Date of Patent: Nov. 25, 2014

(54) CHARGING DEVICE

(71) Applicant: Bosch Mahle Turbo Systems GmbH & Co. KG, Stuttgart (DE)

(72) Inventors: Thanh-Hung Nguyen-Schaefer, Asperg (DE); Heinz Bernd Haiser, Ludwigsburg (DE); Martin Knopf, Baden-Baden (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 0 days.

(21) Appl. No.: 13/691,200

(22) Filed: Nov. 30, 2012

(65) Prior Publication Data

US 2013/0164128 A1    Jun. 27, 2013

(30) Foreign Application Priority Data

Dec. 2, 2011    (DE) .......................... 10 2011 087 628

(51) Int. Cl.
| | | |
|---|---|---|
| *F16C 17/02* | (2006.01) | |
| *F01D 25/22* | (2006.01) | |
| *F04D 29/063* | (2006.01) | |

(52) U.S. Cl.
CPC .................... *F04D 29/063* (2013.01)
USPC ........................ 384/107; 417/407

(58) Field of Classification Search
CPC .. F16C 17/02; F16C 2360/24; F16C 2360/45; F01D 25/166; F05D 2220/40; F05D 2250/611
USPC .......................... 384/107; 417/407
See application file for complete search history.

(56) References Cited

U.S. PATENT DOCUMENTS

| | | | | |
|---|---|---|---|---|
| 6,095,690 A | * | 8/2000 | Niegel et al. .................. | 384/293 |
| 6,220,758 B1 | * | 4/2001 | Ono et al. ..................... | 384/286 |
| 7,290,936 B2 | * | 11/2007 | Tsuji et al. .................... | 384/293 |

FOREIGN PATENT DOCUMENTS

| | | |
|---|---|---|
| DE | 102008000554 A1 | 9/2009 |
| DE | 102008060369 A1 | 6/2010 |
| DE | 102008060370 A1 | 6/2010 |
| DE | 102009059660 A1 | 6/2011 |
| WO | WO 2006096062 A1 * | 9/2006 |

OTHER PUBLICATIONS

Machine translation DE-102008000554-A1.*
Machine translation DE-102008060369-A1.*
Machine translation DE-102008060370-A1.*
Machine translation DE-102009059660-A1.*
English Language Abstract of DE 10 2008 000 554.
English Language Abstract of DE 10 2008 060 369.
English Language Abstract of DE 10 2008 060 370.
English Language Abstract of DE 10 2009 059 660.
German Search Report dated Jul. 16, 2012.

* cited by examiner

*Primary Examiner* — Thomas R. Hannon
(74) *Attorney, Agent, or Firm* — Rader, Fishman & Grauer PLLC

(57) ABSTRACT

A charging device may include a shaft rotatably mounted on at least one slide bearing in a shaft bearing region. At least one flow opening for introducing and discharging a fluid may be defined on the shaft bearing region, wherein the shaft in the shaft bearing region may have two outer portions each running in a circumferential direction and axially binding an inner portion. At least one of the outer portions on its surface may include at least one microstructure.

21 Claims, 3 Drawing Sheets

CHARGING DEVICE

CROSS-REFERENCE TO RELATED APPLICATION

This application claims priority to German Patent Application 10 2011 087 628.6, filed on Dec. 2, 2011, which is hereby incorporated by reference in its entirety.

TECHNICAL FIELD

The present invention relates to a charging device, in particular to an exhaust gas turbocharger, having a shaft, which is rotatably mounted with the help of at least one radial slide bearing. The invention additionally relates to a shaft for such a charging device.

BACKGROUND

A charging device, in particular an exhaust gas turbocharger comprises a shaft for the drive transmission between a turbine wheel and a compressor wheel. The shaft is usually arranged in a bearing housing of the charging device, wherein a rotatable mounting of the shaft can be ensured with a radial slide bearing. Usually, two such slide bearings are provided, which mount the shaft on axially spaced shaft mounting regions each. To avoid or reduce wear, a lubricant, in particular oil, can be introduced in the respective shaft bearing region.

Disadvantageous hereby is that between the shaft and the slide bearing, in particular at low rotational speeds or rotations of the shaft, friction can nevertheless occur. This is the case in particular during the starting of the charging device and thus during the starting of the rotation of the shaft, since the lubricant can then have flowed out of the shaft bearing region. In addition, more and more motor vehicles, in which the charging device can be arranged, have a so-called start-stop function. The start-stop function serves the purpose of lowering the energy consumption of the motor vehicle, in particular the fuel consumption, wherein a combustion engine of the motor vehicle, on which the charging device is usually arranged, is briefly switched off during rest phases of the motor vehicle, for example when stopping at a traffic light. Accordingly, the charging device is also switched off and subsequently started again. Consequently, with vehicles having said start-stop function, an increased friction between the shaft and the slide bearing and thus an increased wear occurs.

SUMMARY

The present invention deals with the problem of stating an improved or at least alternative embodiment for a charging device, in particular an exhaust gas turbocharger, preferentially of a combustion engine, which is characterized in particular by a reduced friction between a shaft and a slide bearing and/or a reduced wear.

According to the invention, this problem is solved through the subject of the independent claims. Advantageous embodiments are subject of the dependent claims.

The present invention is based on the general idea of providing the surface of a shaft of a charging device in a shaft bearing region, in which a radial slide bearing rotatably mounts the shaft, with a microstructuring and therewith reducing a friction between the shaft and the slide bearing in particular in the shaft bearing region. Here, the knowledge is utilised in particular that a microstructure having the usual dimensions of a few μm is able to store a lubricant located between the shaft and the slide bearing in the shaft bearing region, so that lubricant upon a stoppage of the shaft can remain in the shaft bearing region. Accordingly, the lubricant can be directly utilised for the friction reduction during the next starting of the shaft, in particular before additional lubricant is introduced into the shaft bearing region.

The charging device, which in particular can be embodied as exhaust gas turbocharger, comprises the shaft, which is rotatably mounted with the help of at least one such radial slide bearing. Here, the respective mounting is effected in the shaft bearing region, which in particular corresponds to a contact region between the shaft and the associated slide bearing. For reducing the friction between the shaft and the slide bearing, the lubricant is provided, which for example is fed to the shaft bearing region or discharged from the shaft bearing region through a flow opening or a plurality of flow openings. The lubricant is preferentially a lubricating oil, which is why in the following the term oil instead of lubricant is used.

Corresponding to the inventive idea, the shaft comprises three portions in the shaft bearing region. Here, two outer portions running in circumferential direction bound an inner portion likewise running in the circumferential direction. The circumferential direction relates to the shaft, so that the respective portions of the shaft can enclose the shaft in the shaft bearing region jacket-like. The respective shaft bearing region thus comprises an inner portion, which in the direction running axially to the outside is bounded by such an outer portion each. Preferably, the inner portion is arranged in the middle or centrally in the shaft bearing region. In addition, the outer portions have the same size and/or shape. At least one of the portions comprises at least one microstructure on its surface. The respective microstructure is preferably a clearance or recess, which typically has dimensions, i.e. a length, a width and a depth in the range of micrometers, however a maximum of 100 μm. Alternatively, the respective microstructure can be designed as a protrusion, wherein in this case the depressions between the respective protrusions can serve for storing the oil. The microstructuring in this case comprises at least two such microstructures, wherein the microstructures can have different sizes and/or shapes or be identical.

Preferred are embodiments, wherein at least one of the outer portions, preferably however both, comprise microstructures which are arranged along the entire circumferential direction in the associated outer portion. However, conceivable are also embodiments, wherein the microstructuring is arranged only in a part of the associated outer portion, wherein the respective microstructures can also be arranged cylindrically or annularly on the respective outer portion.

The inner portion can in particular serve the purpose of distributing the oil flowing from the flow opening in the shaft bearing region. Accordingly, the respective flow opening can be formed in the slide bearing or assigned to the latter. Thus, the oil flows through the flow opening to the inner portion and is distributed within the shaft bearing region through the rotation of the shaft, wherein the microstructuring or the respective microstructure serves the purpose of storing a part of this oil during the stoppage of the shaft, i.e. in a state in which the shaft is not rotating, so that it cannot flow out via the associated flow opening. This stored oil is available from the beginning for reducing the friction between the shaft and the slide bearing upon the next or following starting of the shaft.

The inner portion can also comprise at least one such microstructure, wherein embodiments are preferred, wherein the inner portion in a region running along the circumferential direction, which is arranged preferentially in the middle in the shaft bearing region, has no such microstructure.

According to a preferred embodiment, the depth of the microstructure runs asymmetrically along a structure line. This means in particular that the depth along the structure line has a maximum value that is displaced from the middle of the microstructure. In other words, a maximum depth of the microstructure is not formed in the middle in the microstructure along the structure line, wherein the maximum depth is arranged or formed offset in the direction of the inner portion or in the direction of the middle of the shaft bearing region. Here, the structure line in particular predetermines a direction in which a plurality of microstructures are arranged one after the other. The orientation of the structure line comprises an axial component and a circumferential component. The axial component runs parallel to the axial direction of the shaft and thus parallel to the rotary axis of the shaft, while the circumferential component runs along the circumferential direction of the shaft. Since the circumferential direction of the shaft has a curvature, the structure line is curved corresponding to the surface of the shaft. The structure line can thus run in particular helically. The structure line can furthermore correspond to a flow direction of the oil with rotating shaft. Preferentially, the axial component of the structure line corresponds to the axial component of the flow direction of the oil with rotating shaft. Here, the knowledge is utilised that such a depth profile of the microstructure can serve as a ramp for the oil, which upon the rotation of the shaft and because of the forces that are present upon the rotation of the shaft, in particular centrifugal forces, presses the oil away from the shaft and in the direction of the slide bearing, so that between the shaft and the slide bearing an oil film is formed, which prevents or at least reduces the friction between the shaft and the slide bearing from the beginning.

The formation of the oil film immediately after the start of the shaft can be improved or amplified in that a plurality, preferentially all microstructures have such a ramp-like design, wherein the depth along the structure line runs asymmetrically and wherein in particular the maximum depth is formed displaced to the inside. Along a direction running transversely to the structure line, the depth can have any shape, while it can run symmetrically along this direction so that the maximum depth along this direction is formed in the middle or centrally. The maximum depth preferentially amounts to less than 10 µm and in particular approximately 5 µm.

With a further advantageous embodiment, the microstructure is formed longitudinally and accordingly as a length that is greater than a width of the microstructure. Preferentially, the microstructure is formed on the associated portion such that the length runs parallel to the associated structure line. This means that the depth of the microstructure along the or in longitudinal section can run asymmetrically while the depth along the width or in cross section can run symmetrically. The maximum depth of the microstructure is preferably formed in the range between a quarter and a third of the length. Thus, the length up to this range increases greatly and subsequently decreases less greatly.

The ratio between the length and the width can be between 2:1 and 3:1. The length in particular can amount to between 15 to 30 µm. Accordingly, the width amounts to between 5 µm and 15 µm. Preferably, the microstructure has a length of approximately 20 µm, while the width amounts to approximately 10 µm.

With a further advantageous configuration, at least two microstructures of one of the portions are arranged adjacent to each other, wherein the adjacent arrangement is preferentially realised at the longitudinal ends of the microstructures. This means that these microstructures are arranged adjacent to each other at their longitudinal ends, wherein associated longitudinal ends are located opposite each other.

According to a further advantageous version, at least two microstructures of one of the portions are arranged adjacently at their longitudinal ends on a structure line of the said type. This means that the microstructures are arranged longitudinally on the structure line, while associated longitudinal ends are located opposite each other. The associated longitudinal ends in this case can contact each other. If a plurality of microstructures are arranged on the structure line in such a manner, the associated portion along the structure line is formed groove-like, while the groove-like embodiment is realised by means of microstructures that are arranged separately from one another. The adjacent arrangement of the microstructures on the structure line leads to an amplification of the ramp effect or to an improved formation of the oil film on starting the shaft and on the other hand in that an increased number of microstructures can be arranged on the associated portion and thus more oil can be stored.

To this end, a plurality of such structure lines can also be provided on one of the portions, along which microstructures, preferentially at their longitudinal ends, are adjacently arranged. Here, the structure lines of one such portion are arranged in particular adjacently in the circumferential direction. In addition, embodiments are preferred wherein the respective portion has structure lines that run equidistantly. This means that the structure lines of the associated portion have the same axial component and the same circumferential component. If all microstructures of the portion have the same size and shape, these can thus be equidistantly arranged along the associated structure line and transversely to the associated structure lines.

With an advantageous embodiment, at least one such structure line of the one outer portion has another axial component than at least one such structure line of the other outer portion. Preferentially, the structure line of the one outer portion has an axial component which is directed opposite to the axial component of the structure line of the other outer portion. This other in particular opposite orientation of the structure lines preferably applies to all structure lines of the respective outer portions. This means that the one outer portion with respect to a plane located in the radial direction can correspond to the mirror image of the other outer portion provided the outer portions and the associated microstructures have the same size and shape. Preferably, the axial components in this case run from the inside to the outside, i.e. from the inner portion in the direction of the associated outer portion.

As illustrated in FIG. 8 and referenced with the same elements as FIG. 2, preferred are embodiments, wherein at least one such microstructure of the inner portion is arranged on the structure line of one of the outer portions. If the inner region comprises a plurality of microstructures, embodiments are conceivable wherein the inner portion comprise the microstructures each of which is arranged on such a structure line of the one outer portion or the other outer portion. Accordingly, these microstructures are formed as an extension of the associated microstructuring of the respective outer portion in the inner portion.

An alternative realisation of the ramp effect is provided in that the depths, in particular the maximum depths, of microstructures adjacent along the structure line decrease along this structure line while the decrease of the depth is provided in particular from the inside to the outside. Here, the asymmetrical profile of the depth of the respective microstructure is not imperative. This means that the respective microstructure can have a constant depth and/or a symmetrical depth profile, wherein the depth or the maximum depth of microstructures adjacent along the structure line decreases from the inside to the outside. It is also conceivable to form the microstructures arranged along the structure line in such a manner that a plurality of adjacent microstructures have the same depth, in particular maximum depth and/or the same depth profile, while a plurality of other microstructures which are adjacent to these ones along the structure line have another depth, in particular maximum depth and/or another depth profile. Here, the depth, in particular the maximum depth, of the microstructures or microstructure groups adjacent along the structure line can decrease in particular from 6 µm to 2 µm.

To reduce the friction between the shaft and the slide bearing, an edge of the respective microstructure can have a fold or a rounding. It is also conceivable to provide the edge of the microstructure with a broken edge and thus reduce the friction between the shaft and the slide bearing or improve the flow of the oil in the shaft bearing region.

It is to be understood that the microstructure can have any shape provided the length, the width and the depth have a value in the micrometer range. In particular, the microstructure in a top view can have an outer contour that is designed circular, oval, rectangular, trapezium-shaped or triangular.

The microstructure or the microstructuring can be realised in any way. The respective microstructure can be produced in particular with the help of a laser or by a laser method. Advantageous when using a laser or a laser method is a precise formation of the respective microstructure and the possibility of forming the respective microstructure as small as possible, i.e. here in the range of a few micrometers.

It is to be understood that the shaft of the charging device according to the invention as an important part of the present invention as such is also part of the scope of this invention.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves without leaving the scope of the present invention. Preferred exemplary embodiments of the invention are shown in the drawings and are explained in more detail in the following description, wherein same reference characters relate to same or similar or functionally same components.

BRIEF DESCRIPTION OF THE DRAWINGS

Here it shows, in each case schematically.

DETAILED DESCRIPTION

Figure 1:
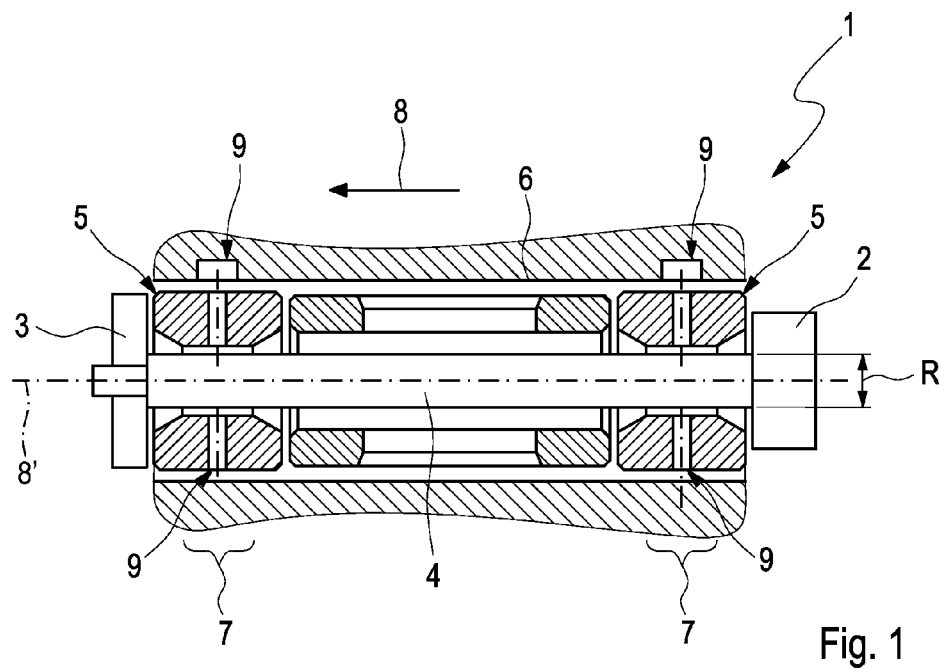
FIG. 1 a section through a charging device,
FIG. 2 a developed view of the charging device,
FIG. 3 a top view of a microstructure,
FIG. 4 a cross section through the microstructure,
FIG. 5 a longitudinal section through the microstructure,
FIGS. 6 and 7 an arrangement of microstructures each in different embodiment.

According to FIG. 1, a charging device 1, which in particular is designed as an exhaust gas turbocharger 1, comprises a turbine wheel 2 and a compressor wheel 3, which are drive-connected with the help of a shaft 4. To this end, the shaft 4 is rotatably arranged in a bearing housing 6 of the charging device 1 with the help of at least one radial slide bearing 5. With the example shown here, two such radial slide bearings 5 are provided in this case, which rotatably mount the shaft 4 on shaft bearing regions 7 axially spaced from each other. The axial direction indicated by an arrow 8 in this case is provided with respect to the shaft 4 and accordingly corresponds to the axis of rotation 8' of the shaft 4. To reduce the friction between the shaft 4 and the respective slide bearing 5, two flow openings 9 are formed in the respective slide bearing 5 on sides of the respective slide bearing 5 which are located radially opposite, which feed or discharge in particular oil in the respective shaft bearing region 7 between the shaft 4 and the respective slide bearing 5. In addition, the shaft 4 has a constant diameter R axially along the entire respective shaft bearing region 7.

Figure 2:
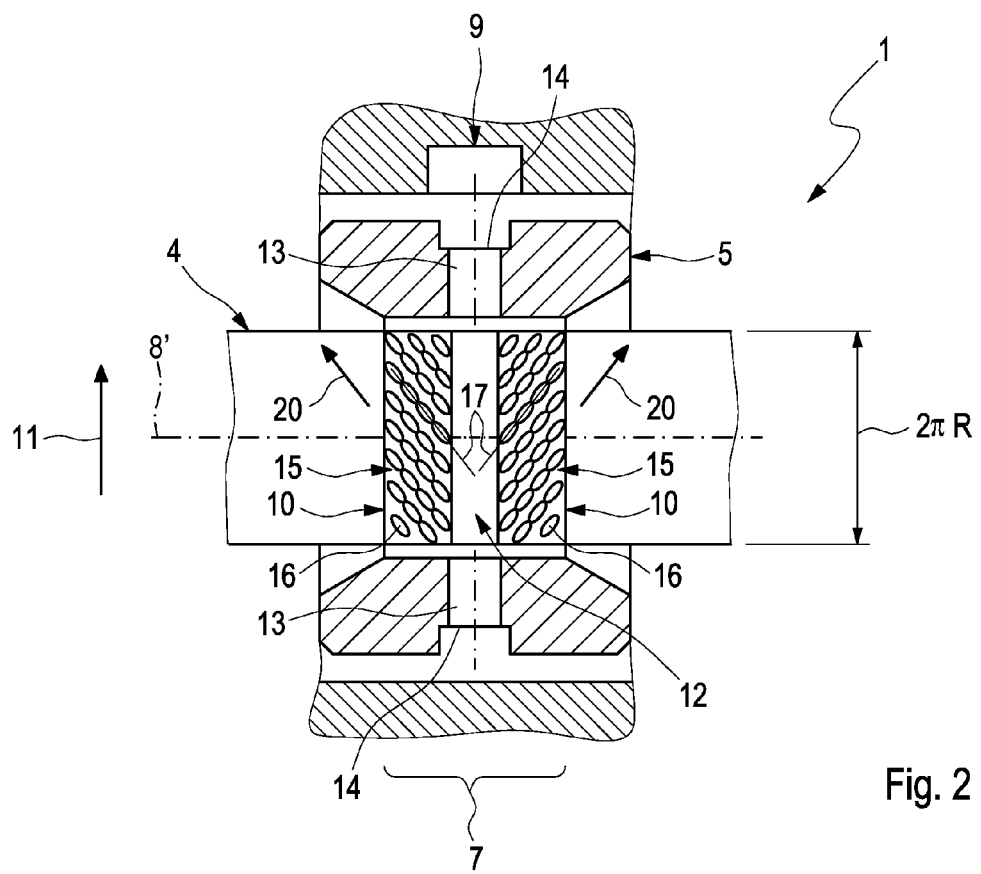

FIG. 2 shows a developed view of the charging device 1 in the region of one of the shaft bearing regions 7. Developed in this case means that the representation shows a projection of the entire circumference of the shaft 4, so that the extension of the shaft 4 running perpendicularly to the axial direction 8 corresponds to the circumference 27a of the shaft 4. In the shaft bearing region 7, the shaft 4 has two outer portions 10 which extend along the entire circumferential direction indicated by an arrow 11 and thus entirely enclose the shaft 4 along the circumferential direction 11. The outer portions 10 axially bound an inner portion 12 in the shaft bearing region 7, which likewise extends along the entire circumferential direction 11. The two outer portions 10 are designed the same and have the same size and shape. The inner portion 12 is designed smaller and arranged in the middle in the shaft bearing region 7 so that the inner portion 12 runs parallel to channels 13 of the slide bearing 5, which supplies the inner portion 12 with a lubricant, in particular oil via an annular groove 14 of the slide bearing 5, which runs along the entire circumferential direction 11 and is fluidically connected to the flow openings 9.

On its outer surface, the respective outer portion 10 has a microstructuring 15, which on the surface of the associated outer portion 10 runs along the entire circumferential direction 11. The respective microstructuring 15 comprises a plurality of microstructures 16. The microstructures 16 of the respective outer portions 10 have an elongated fishbone-like shape, wherein the microstructures 16 are arranged lengthwise on structure lines 17. This means that the microstructures 16 formed in an elongated manner are arranged adjacent to one another at their longitudinal ends along associated structure lines 17. The respective structure line 17 in this case has an axial component running along the axial direction 8 and a circumferential component running along the circumferential direction 11. Thus, the structure line 17 has a straight profile merely in the projection shown here and in this manner is shaped curved on the shaft corresponding to the curved surface of the shaft 4. The structure lines 17 of the respective outer portions 10 run equidistantly in the case of the embodiment shown here, while the axial components of the structure lines 17 of the one outer portion 10 runs in the opposite axial direction 8 compared to the axial component of the structure lines 17 of the other outer portion 10. In addition, the microstructures 16 of the two outer portions 10 are formed the same in the shown representation so that the one outer portion 10 with respect to an inner portion 12 running radially in the middle corresponds to the mirror image of the other outer portion 10. Here, the structure lines 17 run in particular parallel to a flow direction 20 of the respective outer portion 10, which is obtained upon a rotation of the shaft 4 against the shown circumferential direction 11.

Figure 3:
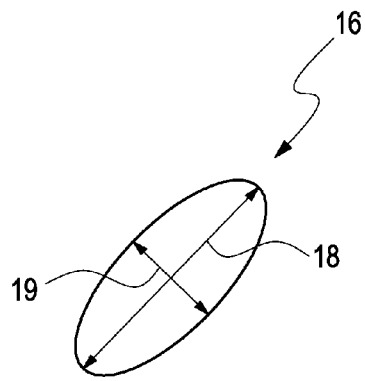

FIG. 3 shows such a microstructure 16. The elongated microstructure 16 has a length 18 and a width 19 running perpendicularly to the length 18, wherein the length 18 is formed in the ratio of approximately 2:1 compared to the width 19 and has a value of for example 20 µm, while the width has a value of 10 µm. With the embodiment shown in FIG. 2, the length 18 of the microstructures 16 thus runs along the associated structure line 17.

Figure 4:
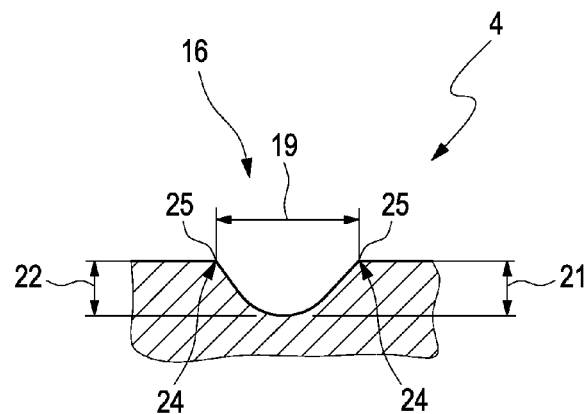

FIG. 4 shows a cross section through the microstructure 16 shown in FIG. 3. In cross section, i.e. along the width 19, the microstructure 16 has a maximum depth 21, while the depth 22 of the microstructure 16 runs symmetrically along the width 19, so that the maximum depth 21 with respect to the width 19 is formed in the middle.

Figure 5:
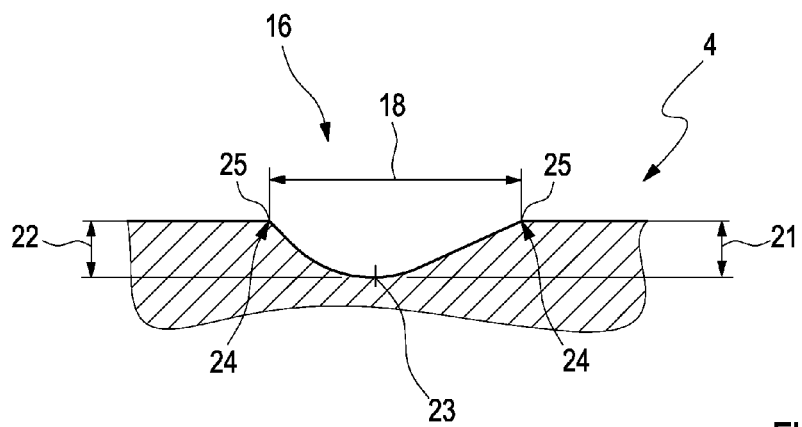

A longitudinal section of the microstructure 16 shown in FIGS. 3 and 4 is shown in FIG. 5. The depth 22 along the length 18 has an asymmetrical profile. Here, the maximum depth 21 is displaced from a longitudinal middle 23 of the microstructure 16 to the inside, i.e. in the direction of the inner portion 12. Along the length 18, the microstructure 16 consequently forms a ramp-like shape in order to press the oil located in the microstructure 16 upon the rotation of the shaft 4 out of the microstructure 16 and against the slide bearing 5 in a simplified manner and thus form an oil film between the shaft 4 and the slide bearing 5.

As is evident in FIGS. 4 and 5, an edge 24 of the microstructure 16 has a fold, a rounding 25 or a broken edge, in order to additionally reduce the friction between the shaft 4 and the slide bearing 5.

Figure 6:
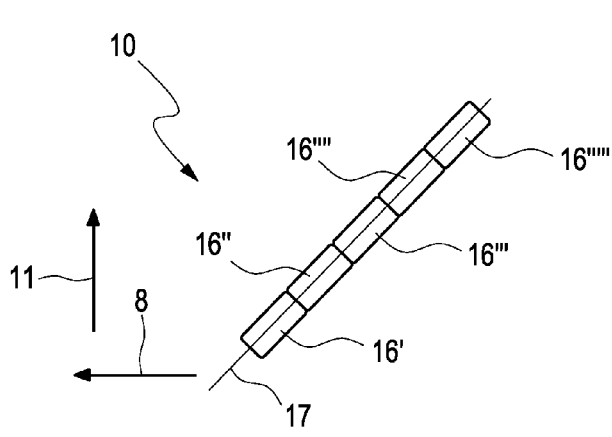
Figure 7:
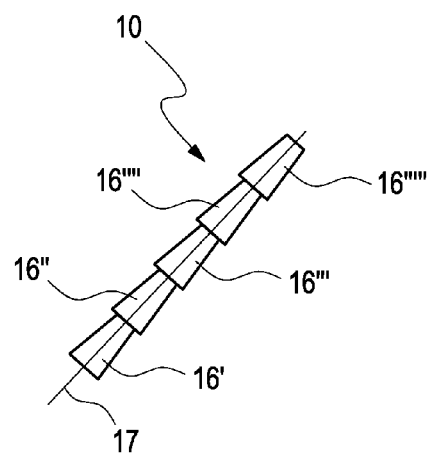
Figure 8:
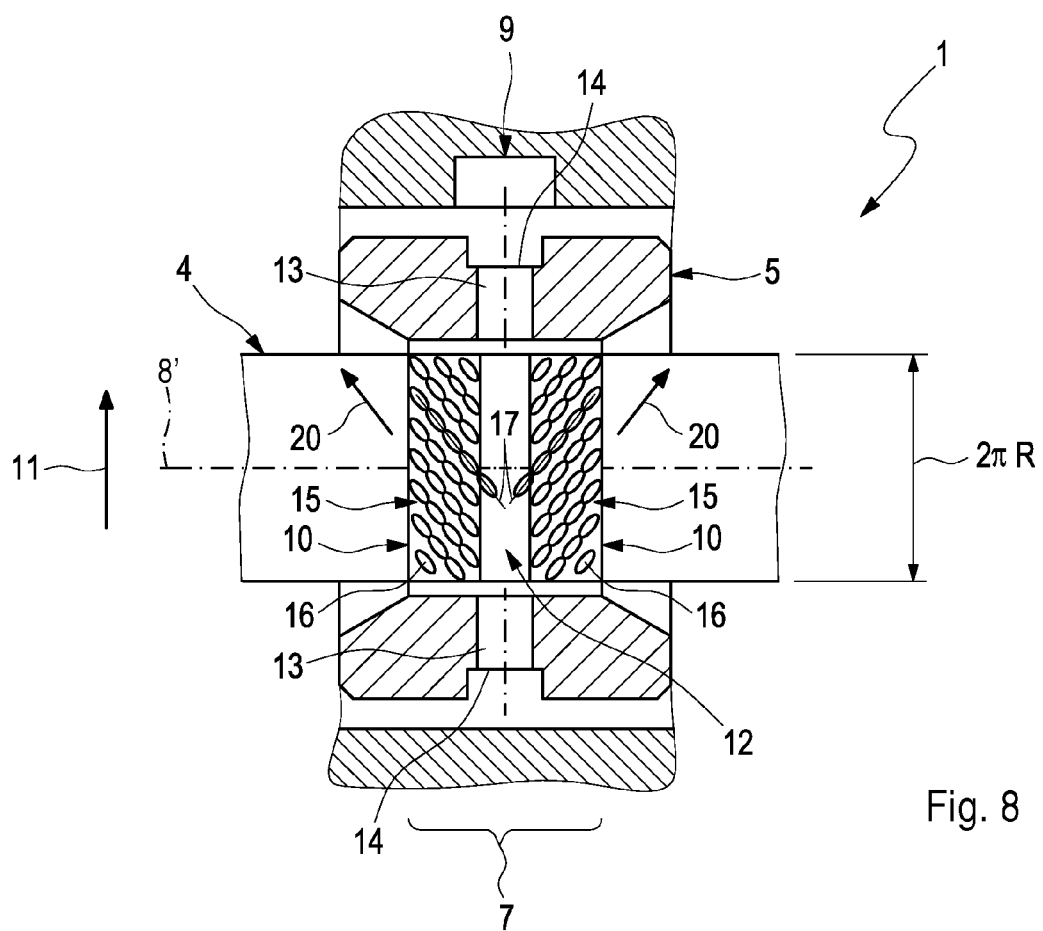
FIG. 8 illustrates an exemplary developed view of the charging device of FIG. 1 according to another implementation.

FIGS. 6 and 7 show alternative possibilities in order to create said ramp effect, wherein in this case likewise the developed view is visible. With the embodiment shown in FIG. 6, the microstructures 16 are arranged along the structure line 17 and directly adjacent to one another at the longitudinal ends. The maximum depth 21 of microstructures 16 arranged adjacent to each other in this case preferably decreases along the structure line 17 from the inside to the outside. This means in particular that the maximum depth 21 of the lowermost microstructure 16' in the shown representation can amount to 6 µm while the maximum depth 21 of the uppermost microstructure 16'''' can amount to 2 µm. Here, the decrease of the maximum depth 21 can follow an even course. This means that the maximum depth 21 of the microstructure 16'' can amount to 5 µm, the maximum depth 21 of the microstructure 16''' can amount to 4 µm and the maximum depth of the microstructure 16'''' can amount to 3 µm. In comparison with the microstructures 16 shown in FIGS. 2 to 5, the microstructures 16 shown in FIG. 6 have a rectangular shape with rounded corners.

The microstructures 16 shown in FIG. 7 differ from the microstructures 16 shown in FIG. 6 merely in the shape. The microstructures 16 shown here have a trapezium-like shape while a narrow longitudinal end each and a long longitudinal end are directly adjacent.

The invention claimed is:

1. An exhaust gas turbocharger, comprising:
a shaft rotatably mounted in a bearing housing via at least one radial slide bearing, the shaft being mounted on the at least one slide bearing in a shaft bearing region;
at least one flow opening for at least one of introducing and discharging a fluid defined on the shaft bearing region;
wherein the shaft in the shaft bearing region has two outer portions each running in a circumferential direction and axially binding an inner portion;
wherein at least one of the outer portions includes a surface comprising at least one microstructure, the microstructure including a depth that runs asymmetrically along a structure line, the depth having an axial component and a circumferential component, wherein the axial component runs parallel to an axial direction of the shaft and the circumferential component runs along a circumferential direction of the shaft.

2. A charging device, comprising:
a shaft carrying at least one of a turbine wheel and a compressor wheel, the shaft rotatably mounted via at least one radial slide bearing, wherein
the shaft is mounted on the at least one slide bearing in a shaft bearing region,
at least one flow opening for at least one of introducing and discharging a fluid defined on the shaft bearing region,
wherein the shaft in the shaft bearing region has two outer portions each running in a circumferential direction and axially binding an inner portion,
wherein at least one of the outer portions includes a surface comprising at least one microstructure, the microstructure including a depth that runs asymmetrically along a structure line, the depth having an axial component and a circumferential component, wherein the axial component runs parallel to an axial direction of the shaft and the circumferential component runs along a circumferential direction of the shaft.

3. A charging device, comprising:
a shaft rotatably mounted with at least one radial slide bearing, wherein
the shaft is mounted on the at least one slide bearing in a shaft bearing region,
at least one flow opening for at least one of introducing and discharging a fluid defined on the shaft bearing region,
wherein the shaft in the shaft bearing region has two outer portions each running in a circumferential direction and axially binding an inner portion,
wherein at least one of the outer portions on its surface comprises at least one microstructure, the microstructure including a depth that runs asymmetrically along a structure line, the depth having an axial component and a circumferential component, wherein the axial component runs parallel to an axial direction of the shaft and the circumferential component runs along a circumferential direction of the shaft.

4. The charging device according to claim 3, wherein a maximum depth of the microstructure is formed offset to the inside along the structure line.

5. The charging device according to claim 4, wherein the maximum depth decreases from the inside to the outside.

6. The charging device according to claim 4, wherein the microstructure is elongated and a length of the microstructure runs parallel to the structure line.

7. The charging device according to claim 6, wherein the microstructure includes at least two microstructures, the at least two microstructures being arranged adjacently to one another at respective longitudinal ends along the structure line.

8. The charging device according to claim 7, wherein at least one of the outer portions has two such structure lines running equidistantly to each other.

9. The charging device according to claim 8, wherein the inner portion includes at least one microstructure arranged on one of the structure lines of one of the outer portions.

10. The charging device according to claim 9, wherein the other outer portion includes a microstructure having a depth that runs along a structure line, the depth having an axial component, wherein the axial component of the structure line of the one outer portion run in opposite axial direction than the axial component of the structure line of the other outer portion.

11. The charging device according to claim 10, wherein the maximum depth decreases from the inside to the outside.

12. The charging device according to claim 3, wherein the microstructure is elongated and a length of the microstructure runs parallel to the structure line.

13. The charging device according claim 12, wherein the slide bearing includes an annular groove fluidically connected to the flow opening, the flow opening running in the circumferential direction in a region of the inner portion.

14. The charging device according to claim 12, wherein the length to a width of the microstructure running transversely to the length includes a ratio between 2:1 and 3:1.

15. The charging device according to claim 3, wherein the microstructure includes at least two microstructures, the at least two microstructures being arranged adjacently to one another at respective longitudinal ends along the structure line.

16. The charging device according to claim 15, wherein at least one of the outer portions has two such structure lines running equidistantly to each other.

17. The charging device according to claim 3, wherein the inner portion includes at least one microstructure arranged on one of the structure lines of one of the outer portions.

18. The charging device according to claim 3, wherein the other outer portion includes a microstructure having a depth that runs along a structure line, the depth having an axial component, wherein the axial component of the structure line of the one outer portion runs in opposite axial direction than the axial component of the structure line of the other outer portion.

19. The charging device according to claim 3, wherein the microstructure is produced with a laser.

20. The charging device according to claim 3, wherein the microstructure has at least one of a curved, angular, trapezium-shape and oval shape.

21. The charging device according to claim 3, wherein an edge of the microstructure has a rounding.

* * * * *